United States Patent
Kang et al.

(10) Patent No.: US 10,378,332 B2
(45) Date of Patent: Aug. 13, 2019

(54) MONITORING A COMPONENT USED IN A WELL OPERATION

(71) Applicants: Yongnam Lion Kang, Magnolia, TX (US); Larry D. Elijah, San Antonio, TX (US)

(72) Inventors: Yongnam Lion Kang, Magnolia, TX (US); Larry D. Elijah, San Antonio, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 315 days.

(21) Appl. No.: 15/185,309

(22) Filed: Jun. 17, 2016

(65) Prior Publication Data
US 2017/0362928 A1    Dec. 21, 2017

(51) Int. Cl.
| | |
|---|---|
| G06F 19/00 | (2018.01) |
| E21B 47/06 | (2012.01) |
| G05B 19/048 | (2006.01) |
| G05B 19/042 | (2006.01) |
| G05B 23/02 | (2006.01) |

(52) U.S. Cl.
CPC .......... *E21B 47/06* (2013.01); *G05B 19/048* (2013.01); *G05B 19/0428* (2013.01); *G05B 23/027* (2013.01); *G05B 23/0235* (2013.01)

(58) Field of Classification Search
CPC ............... G07C 5/008; G07C 5/0808; B60N 2002/0272
USPC ............... 702/183, 182, 184, 185, 188, 6
See application file for complete search history.

(56) References Cited

U.S. PATENT DOCUMENTS

| | | | |
|---|---|---|---|
| 7,181,370 | B2 | 2/2007 | Furem et al. |
| 7,206,646 | B2 | 4/2007 | Nixon et al. |
| 7,630,802 | B2 | 12/2009 | Breed |
| 7,742,861 | B2 | 6/2010 | Lee |
| 7,941,158 | B2 | 5/2011 | Olson |
| 8,204,717 | B2 | 6/2012 | McLaughlin et al. |
| 9,235,938 | B2 | 1/2016 | Sixt, Jr. et al. |
| 2006/0193262 | A1 | 8/2006 | McSheffrey et al. |
| 2010/0256862 | A1 | 10/2010 | Verhardt |
| 2011/0130905 | A1 | 6/2011 | Mayer |

(Continued)

FOREIGN PATENT DOCUMENTS

WO    2015187796 A1    12/2015

OTHER PUBLICATIONS

Murakami et al.,"Development of Vehicle Health Monitoring System (VHMS/WebCARE) for Large-Sized Construction Machine", Komatsu, Technical Report, vol. 48, No. 150, 2002, p. 1-7.

(Continued)

*Primary Examiner* — Edward Raymond
(74) *Attorney, Agent, or Firm* — Cantor Colburn LLP

(57) ABSTRACT

Examples of techniques for monitoring a component used in well operation are disclosed. In one example implementation according to aspects of the present disclosure, a method may include: receiving, by a processing system, sensor data from a sensor, wherein the sensor collects data relating to a component used in the well operation; analyzing, by the processing system, the sensor data to determine whether the component used in the well operation is experiencing an error condition; and alerting, by the processing system, a user of the error condition when it is determined that the component used in the well operation is experiencing an error condition.

15 Claims, 5 Drawing Sheets

(56) References Cited

U.S. PATENT DOCUMENTS

| | | |
|---|---|---|
| 2011/0282630 A1 | 11/2011 | Rikkola et al. |
| 2013/0151156 A1 | 6/2013 | Noui-Mehidi et al. |
| 2013/0173505 A1 | 7/2013 | Balogun et al. |
| 2013/0282335 A1 | 10/2013 | Hudson et al. |
| 2014/0074409 A1 | 3/2014 | Boyd et al. |
| 2014/0251688 A1 | 9/2014 | Turner et al. |
| 2015/0275648 A1* | 10/2015 | Wang .................. E21B 44/00 702/9 |

OTHER PUBLICATIONS

International Search Report and Written Opinion cited in International Application No. PCT/US17/037669 dated Sep. 11, 2017, 11 pgs.

\* cited by examiner

| ITEM | Condition 1 | Condition 2 | Condition 3 | Condition 4 |
|---|---|---|---|---|
| | Engine RPM | Gear | Tolerance(New <-- Old) | Interval |
| Engine RPM | > 1500 | >= 1 | 90 <-85 | 3 times & appear in each 5 seconds |
| Percent Load | > 1500 | >= 1 | 15 | 3 times & appear in each 5 seconds |
| Pump Pressure | > 1500 | >= 1 | 400 + (Pressure - 6000) * 0.025 <-250 | 3 times & appear in each 5 seconds |
| Super Charge Pressure | > 1500 | >= 1 | 20 | 3 times & appear in each 5 seconds |
| Vibration Sensor | > 1500 | >= 1 | 0.5 <- 0.3 | 3 times & appear in each 2 seconds |

FIG. 2

MONITORING A COMPONENT USED IN A WELL OPERATION

BACKGROUND

The present disclosure relates to well operations and, more particularly, to monitoring a component used in a well operation.

Boreholes are drilled into earth formations having reservoirs of hydrocarbons in order to extract the hydrocarbons through the boreholes to the surface. Various components (e.g., pipe segments, pipe couplings, pipe valves, manifolds, etc.) connect equipment (e.g., blending equipment, pumping equipment, etc.) at the earth's surface to the bore holes. The components, such as those that connect the equipment trucks to the boreholes carry fluid, such as fracturing fluid, to the boreholes to be used to extract the hydrocarbons through the boreholes. Over time, the components may degrade, require maintenance or service, and/or need to be replaced, etc.

BRIEF SUMMARY

According to aspects of the present disclosure, techniques including methods, systems, and/or computer program products for monitoring a component used in a well operation are provided. An example method may include: receiving, by a processing system, sensor data from a sensor, wherein the sensor collects data relating to a component used in the well operation; analyzing, by the processing system, the sensor data to determine whether the component used in the well operation is experiencing an error condition; and alerting, by the processing system, a user of the error condition when it is determined that the component used in the well operation is experiencing an error condition.

According to additional aspects of the present disclosure, an example method may include: receiving, by a processing system, noise data from a sensor, wherein the sensor collects noise data relating to a component used in the well operation; analyzing, by the processing system, the sensor data to determine a noise property of the component used in the well operation; determining, by the processing system, whether the noise property exceeds a threshold; and alerting, by the processing system, a user of an error condition when it is determined that the noise property exceeds the threshold.

According to additional aspects of the present disclosure, an example system may include: a memory having computer readable instructions; and a processing device for executing the computer readable instructions. The computer readable instructions may include: receiving sensor data from the at least one sensor for each of the plurality of components used in the well operation; displaying a status of each of the plurality of components used in the well operation, wherein the status is determined based on the sensor data; analyzing the sensor data to determine whether one or more of the plurality of components used in the well operation is experiencing an error condition; and alerting, by the processing system, a user of the error condition and the associated component when it is determined that the one or more of the plurality of components used in the well operation is experiencing an error condition.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

FIG. 2 illustrates a table of conditions for noise band detection for various components used in the well operation 100 according to aspects of the present disclosure;

DETAILED DESCRIPTION

Various implementations are described below by referring to several examples of monitoring a component used in a well operation. At a well operation, a user (e.g., a mechanic or technician) may desire to fix or service components used at the job site between various stages of the job (i.e., during downtime). This enables the components to remain in good repair and working order while reducing the number of job failures and downtime. In particular, the techniques provided herein improve the equipment at the job site by providing alerts when system anomalies occur and/or when service is needed. The present techniques provide component status to the user in real-time or near real-time. It should be appreciated that the present techniques may apply to any component, equipment, device, etc. used at the well operation that is capable of being monitored.

The present techniques reduce the likelihood of a catastrophic failure of equipment by identifying equipment that may be in need of service. By tracking this information, a user can be alerted when a piece of equipment experiences an operational anomaly, is operating outside of normal parameters, is near failure or end of life, etc. This enables the components to be removed from use and/or serviced to prevent a failure. These and other advantages will be apparent from the description that follows.

The teachings of the present disclosure can be applied in a variety of well operations. These operations may involve using one or more treatment agents to treat a formation, the fluids resident in a formation, a wellbore, and/or equipment in the wellbore, such as production tubing. The treatment agents may be in the form of liquids, gasses, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

Figure 1:
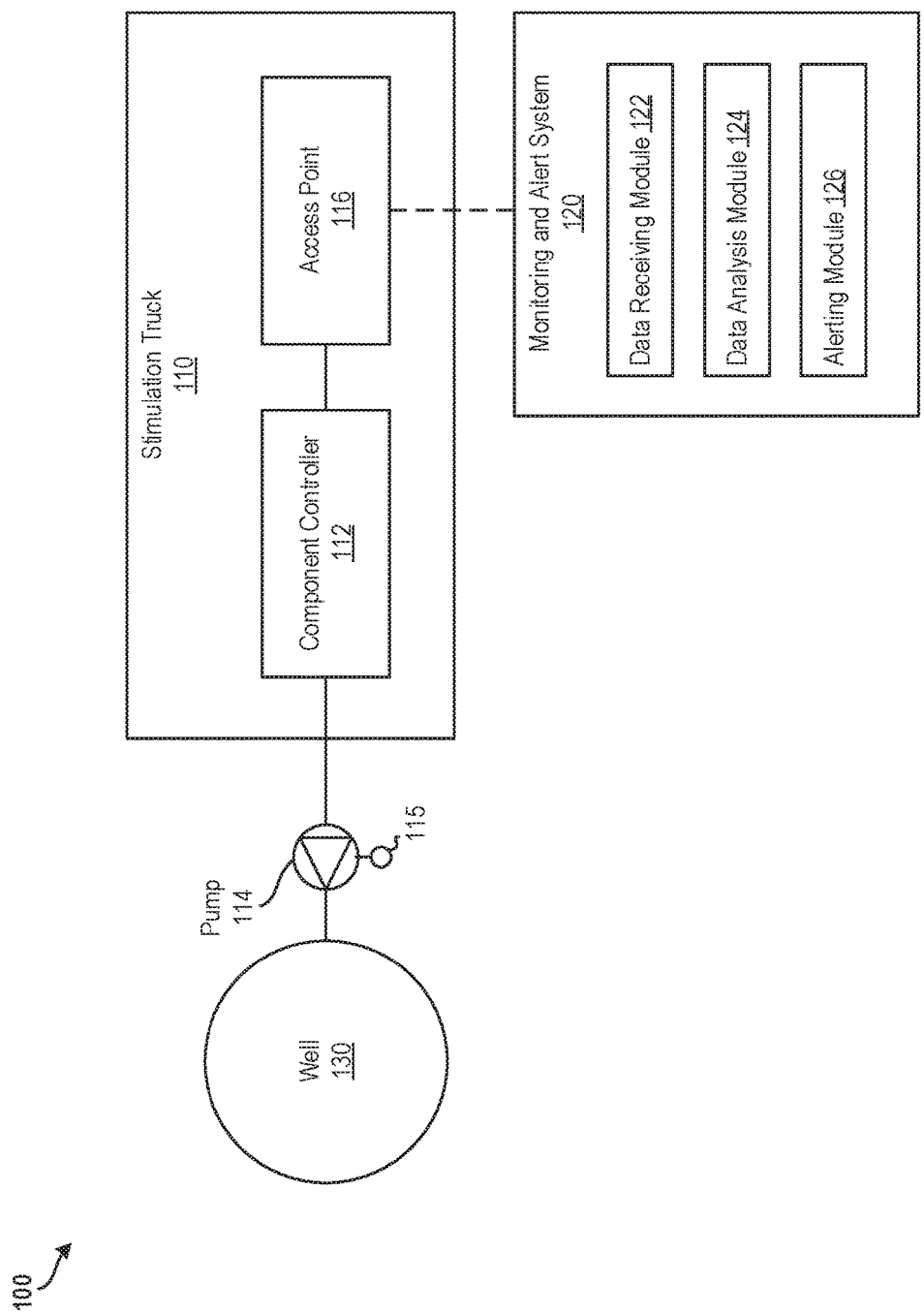
FIG. 1 illustrates a block diagram of a monitoring and alert system to monitor a component at the well operation according to examples of the present disclosure.

FIG. 1 illustrates a block diagram of a monitoring and alert system 120 to monitor a component (e.g., a pump 114) at the well operation 100 according to examples of the present disclosure. At the well operation 100, a user may desire to fix equipment in between stages of operation. This enables the component to be ready at the beginning of the each state of the operation while reducing and/or preventing failures that may shut down a stage of the operation.

The well operation 100 comprises a well 130, at least one component (e.g., the pump 114) and a stimulation truck 110. The stimulation truck is responsible for facilitating operations at the well operation 100 such as controlling the pump 114 and other components (not shown) used in the well operation. In examples of the present disclosure, the stimulation truck 110 comprises a component controller 112 to control the pump 114 and/or other components and an access point 116.

The monitoring and alert system 120 presents the user with a status of the component and detects error conditions in the component by sensing data relating to the component. For example, the pump 114 may be equipped with a sensor 115 (or sensors) for sensing data relating to pump 114. Data relating to the pump 114 may include flow rate, flow volume, duration of use (i.e., equipment hours), revolutions per minute (RPM), pressure, vibration, etc.

According to aspects of the present disclosure, the various components, modules, engines, etc. described FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus, a system memory can store program instructions that when executed by a processing device implement the modules described herein. Other modules may also be utilized to include other features and functionality described in other examples herein.

In aspects of the present disclosure, the monitoring and alert system 120 is a processing system (e.g. the processing system 20 of FIG. 5) that includes a data receiving module 122, a data analysis module 124, and an alert module 126. Alternatively or additionally, the monitoring and alert system 120 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The data receiving module 122 receives the sensor data via the access point 116, which may be a wireless access point. The dashed line of FIG. 1 illustrates a wireless connection between the access point 116 and the monitoring and alert system 120. However, it should be appreciated that in other examples the monitoring and alert system 120 may receive the sensor data directly from the component controller 112 (or another suitable device) via a wired and/or wireless connection.

The data analysis module 124 of the monitoring and alert system 120 analyzes the sensor data to determine whether the component (e.g., the pump 114) used in the well operation 100 is experiencing an error condition. Various error conditions may be determined, such as excessive RPM, excessive pressure, insufficient pressure, excess of duration of use, excessive vibration, and others. It should be appreciated that the list of error conditions is merely exemplary and is not intended to be all inclusive.

To determine whether the component is experiencing an error condition, the data analysis module 124 of the monitoring and alert system 120 compares the sensor data with threshold values for the sensor data. For example, sensor data relating to excess duration of use may be compared to a known service interval for the component. In this example, if the duration of use exceeds the known service interval, the monitoring and alert system 120 determines that an error condition exists. As previously discussed, other types of error conditions may also be detected.

The alert module 126 of the monitoring and alert system 120, upon determining that the component (e.g., the pump 114) is experiencing an error condition, alerts a user of the error condition. In the example of excess duration of use, if the duration of use exceeds the known service interval, the user is alerted that the component should be serviced. In examples, the monitoring and alert system 120 may alert the user if the service interval approaches the known service interval. For example, once the duration of use is, for example, 90% of the known service interval, the user may be alerted.

In additional examples, the monitoring and alert system 120 may remove the component from the well operation. For example, if an error condition is determined, the monitoring and alert system 120 may automatically shut down the component to prevent a failure of the component and/or to prevent a failure of the well operation 100. In other examples, the monitoring and alert system 120 may automatically shut down the well operation 100, for example, if the component cannot be shut down or if doing so would cause the well operation 100 to shut down.

It should be appreciated that, although the present embodiment is discussed using the example of a duration of use and a known service interval, data may be collected and analyzed for any suitable property of a component used in the well operation, and a variety of error conditions may be determined.

According to aspects of the present disclosure, the monitoring and alert system 120 may receive real-time (or near-real time) data, alarms, and interventions from the component controller 112. The monitoring and alert system 120 may also receive unit information, equipment hours, equipment health status, etc. from the component controller 112.

In some embodiments, at the well operation 100, a user of the monitoring and alert system 120 may be presented with alarms, interventions, and equipment hours from site equipment (e.g., the pump 114), etc. on a dashboard, for example. In additional embodiments, the user may receive a notification (e.g., a text message, an email, an automated phone call, etc.) when an error is detected. This enables the user to begin troubleshooting the component and perform maintenance of the component between stages of the operation and/or any time during the operation. This reduces equipment failures and reduces the down time of the well operation.

According to aspects of the present disclosure, the monitoring and alert system 120 may provide one or more of the following: data charts; upper and lower limits process alarms; noise band detection; component life cycle (maintenance data); failure prediction; sensor failure detection; emergency/unusual situation detection; etc.

FIG. 2 illustrates a table of conditions for noise band detection for various components used in the well operation 100 according to aspects of the present disclosure. Noise band detection provides for predictive detection of equipment/component health. For example, vibration/noise of the component may be a symptom of possible component failure (i.e., an error condition). By detecting vibrations/noises, a component may be serviced before a failure occurs.

In an example, and with reference to FIG. 1, the monitoring and alert system 120, receives data from a vibration or noise sensor that collects vibration or noise data for a component, analyzes the vibration or noise data to determine a noise property of the component, and determines whether the noise property exceeds a threshold. A noise property may represent a condition of the component (i.e., engine RPM, pump pressure, etc.)

For example, the vibration or noise sensor may sense data relating to multiple conditions for multiple components (i.e., items of FIG. 2). For example, a condition may be engine RPM exceeding 1500 RPM. Another condition may be pump pressure exceeding a threshold.

When the noise property exceeds a threshold, the monitoring and alert system 120 alerts a user of the error condition. This may include displaying a warning and/or a prompt to make a decision to either keep running the component running, to bypass the component, to disable the component, and/or to shut down the well operation. This decision can be automated and may provide intervention so the well operation can slow down or stop. Different thresholds may be set for warning levels and automatic shutdown levels such that a lower threshold may indicate a warning and a higher threshold may cause the component and/or the well operation to shut down.

The monitoring and alert system 120 of FIG. 1 may also provide component life cycle (Maintenance Data) prediction. For example, the monitoring and alert system 120 may track equipment operational hours including engine hours, transmission hours, pump hours, pump valve hour, power end revolution counts, fluid end revolution counts, valve cycles counts, etc. Based on the operational hours data, component life cycle can be determined.

According to aspects of the present disclosure, pump related life cycle hours can be calculated based on pump pressures range, pump oil lube conditions, pump temperatures, and/or pumping fluid characteristics. For example, the pump valve standard life cycle in certain shale formations is 100 hours.

In one example, as pump pressures increase, the life cycle is shortened. In another example, if the pump oil lube is low, the pump valve life cycle is shorter. In another example, if the pump temperature is low, the pump valve life cycle is shorter. In yet another example, if the fluid density is high, the pump valve life cycle is shorter. In another example, if the valve cycles counts are higher, the pump valve life cycle is shorter. The life cycle components are the followings The monitoring and alert system 120 may also provide predictive analytics for well site equipment health. In particular, the monitoring and alert system 120 may provide real-time (or near real-time) analytics. Failure predictions for each component can be calculated based on temperature range, suction and discharge pressures, lubrication, vibration, fluid characteristics of pumps and blenders, and the like. This enables the monitoring and alert system 120 to determining the following: an optimum fuel efficiency range, optimum equipment utilization setup, optimum torque distributions of the pump trucks with pressures, optimum pump discharge rate, optimum, fluid characteristics, optimum gear position, etc.

The monitoring and alert system 120 may also provide for detecting emergency/unusual situation. For example, emergency/unusual situations may be determined to exist when: a pressure spike occurs, lost communication, lost or low power condition, abnormal values of operating parameters compared to normal operations, incorrect configuration of the components, etc.

Figure 3:
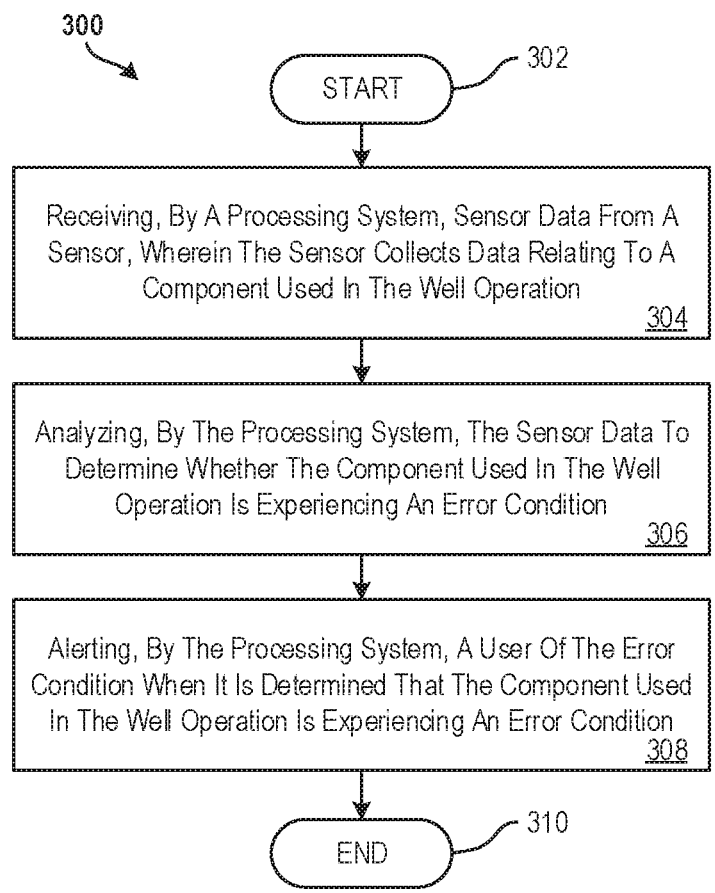
FIG. 3 illustrates a flow diagram of a method for monitoring a component used in a well operation according to aspects of the present disclosure.

Turning now to FIG. 3, a flow diagram of a method 300 for monitoring a component used in well operation is provided according to examples of the present disclosure. The method 300 may be performed by a processing system, such as the monitoring and alert system 120 of FIG. 1, the processing system 20 of FIG. 5, and/or by another suitable processing system.

The method starts at block 302 and continues to block 304. At block 304, the monitoring and alert system 120 receives sensor data from a sensor. The sensor collects data relating to a component used in the well operation. At block 306 of the method 300, the monitoring and alert system 120 analyzes the sensor data to determine whether the component used in the well operation is experiencing an error condition. At block 308, the monitoring and alert system 120 alerts a user of the error condition when it is determined that the component used in the well operation is experiencing an error condition.

The method 300 continues to block 310 and ends. However, additional processes also may be included. It should be understood that the processes depicted in FIG. 3 represent illustrations, and that other processes may be added or existing processes may be removed, modified, or rearranged without departing from the scope and spirit of the present disclosure.

Figure 4:
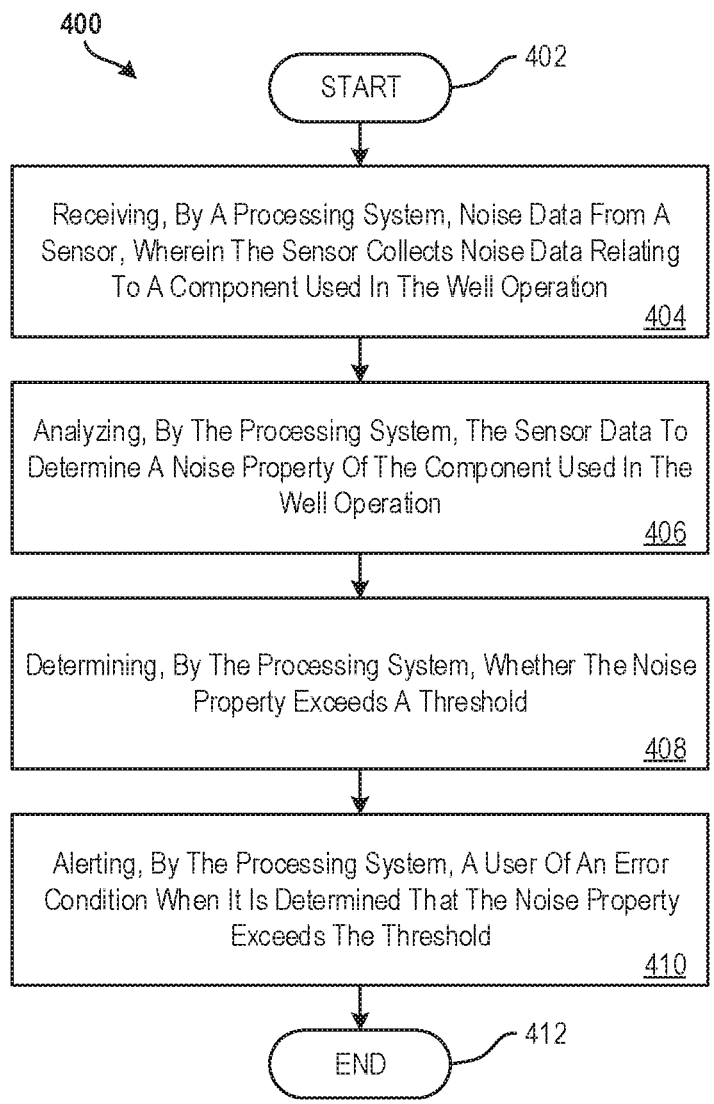
FIG. 4 illustrates a flow diagram of another method for monitoring a component used in a well operation according to aspects of the present disclosure.

Turning now to FIG. 4, a flow diagram of a method 400 for monitoring a component used in well operation is provided according to examples of the present disclosure. The method 400 may be performed by a processing system, such as the monitoring and alert system 120 of FIG. 1, the processing system 20 of FIG. 5, and/or by another suitable processing system.

The method starts at block 402 and continues to block 404. At block 404, the monitoring and alert system 120 receives noise data from a sensor, wherein the sensor collects noise data relating to a component used in the well operation. At block 406 of the method 400, the monitoring and alert system 120 analyzes the sensor data to determine a noise property of the component used in the well operation. At block 408, the monitoring and alert system 120 determines whether the noise property exceeds a threshold. At block 410, the monitoring and alert system 120 alerts a user of an error condition when it is determined that the noise property exceeds the threshold.

The method 400 continues to block 412 and ends. However, additional processes also may be included. It should be understood that the processes depicted in FIG. 4 represent illustrations, and that other processes may be added or existing processes may be removed, modified, or rearranged without departing from the scope and spirit of the present disclosure.

Figure 5:
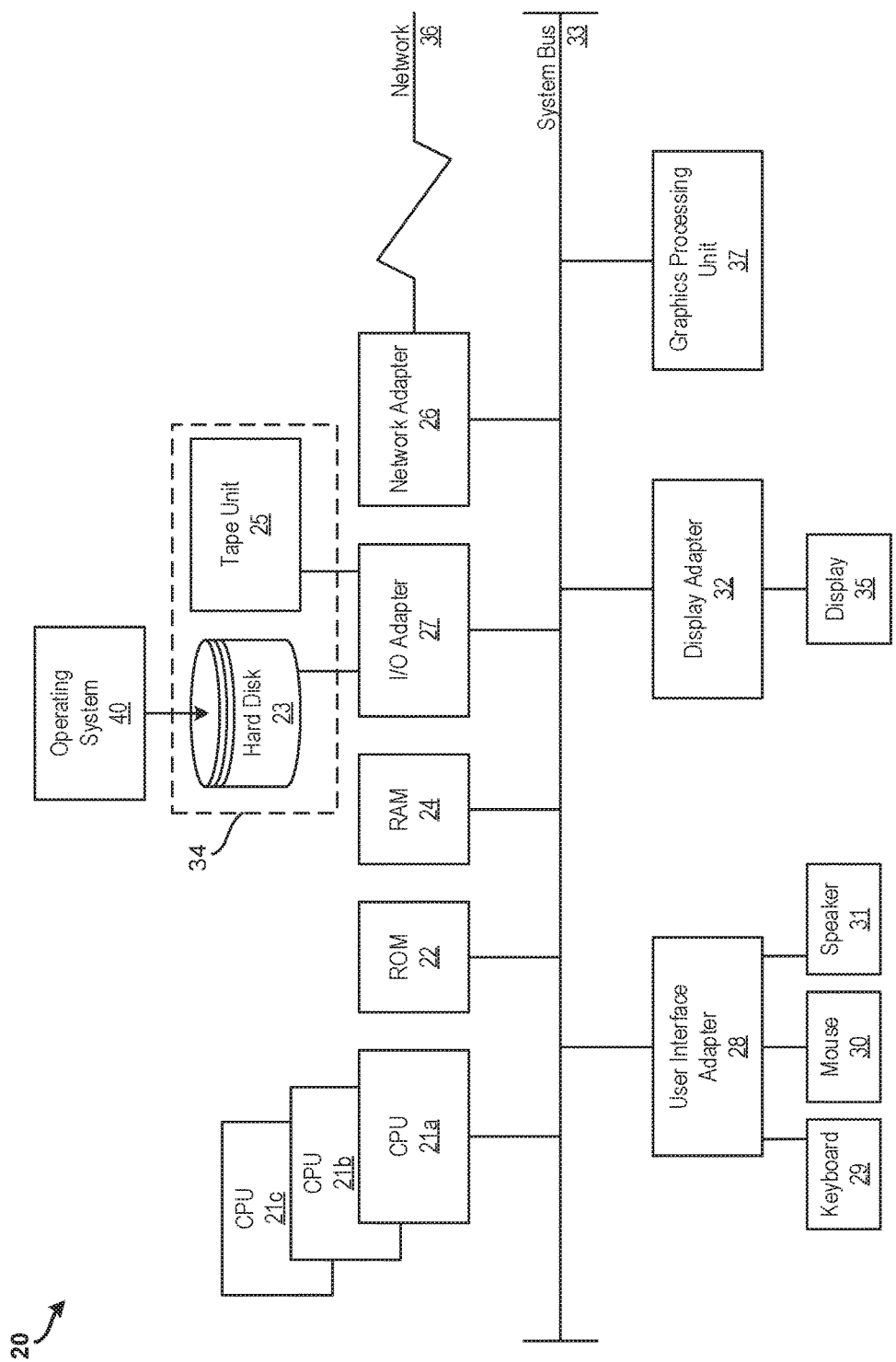
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Set forth below are some embodiments of the foregoing disclosure:

Embodiment 1: A method for monitoring a component used in a well operation, the method comprising: receiving, by a processing system, sensor data from a sensor, wherein the sensor collects data relating to a component used in the well operation; analyzing, by the processing system, the sensor data to determine whether the component used in the well operation is experiencing an error condition; and alerting, by the processing system, a user of the error condition when it is determined that the component used in the well operation is experiencing an error condition.

Embodiment 2: The method of any preceding embodiment, further comprising: displaying, by the processing system, a status of the component used in the well operation, wherein the status is determined based on the sensor data.

Embodiment 3: The method of any preceding embodiment, wherein the status of the component used in the well operation indicates a warning level of one of nominal, warning, or critical.

Embodiment 4: The method of any preceding embodiment, further comprising: removing the component from the well operation when the status indicates a warning level of warning.

Embodiment 5: The method of any preceding embodiment, further comprising: halting the well operation when the status indicates a warning level of critical.

Embodiment 6: A method for monitoring a component used in a well operation, the method comprising: receiving, by a processing system, noise data from a sensor, wherein the sensor collects noise data relating to a component used in the well operation; analyzing, by the processing system, the sensor data to determine a noise property of the component used in the well operation; determining, by the processing system, whether the noise property exceeds a threshold; and alerting, by the processing system, a user of an error condition when it is determined that the noise property exceeds the threshold.

Embodiment 7: The method of any preceding embodiment, wherein the noise property is one of engine revolutions per minute, percent load, pump pressure, super charge pressure, and vibration sensor.

Embodiment 8: The method of any preceding embodiment, further comprising: displaying, by the processing system, a status of the component used in the well operation, wherein the status is determined based on the noise data.

Embodiment 9: The method of any preceding embodiment, wherein the threshold is a first threshold, the method further comprising: removing the component from the well operation when the noise property exceeds a second threshold, wherein the second threshold is greater than the first threshold.

Embodiment 10: The method of any preceding embodiment, further comprising: halting the well operation when the noise property exceeds a third threshold, wherein the third threshold is greater than the second threshold.

Embodiment 11: The method of any preceding embodiment, wherein the alerting further comprises alerting the user to change a specific part of the component used in the well operation based the noise property.

Embodiment 12: A system for monitoring a well operation, the system comprising: a plurality of components used in the well operation, wherein each of the plurality of components comprises at least one sensor to collect data relating to the component; a memory having computer readable instructions; and a processing device for executing the computer readable instructions, the computer readable instructions comprising: receiving sensor data from the at least one sensor for each of the plurality of components used in the well operation; displaying a status of each of the plurality of components used in the well operation, wherein the status is determined based on the sensor data; analyzing the sensor data to determine whether one or more of the plurality of components used in the well operation is experiencing an error condition; and alerting, by the processing system, a user of the error condition and the associated component when it is determined that the one or more of the plurality of components used in the well operation is experiencing an error condition.

Embodiment 13: The system of any preceding embodiment, wherein the error condition is excessive vibration or noise.

Embodiment 14: The system of any preceding embodiment, wherein the instructions further comprise: halting the well operation when one or more of the plurality of components used in the well operation is experiencing an error condition.

Embodiment 15: The system of any preceding embodiment, wherein the instructions further comprise: removing the component from the well operation when one or more of the plurality of components used in the well operation is experiencing an error condition.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

Additionally, the term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A method for monitoring a component used in a well operation, the method comprising:
   receiving, by a processing system, sensor data from a sensor, wherein the sensor collects data relating to a component used in the well operation;
   analyzing, by the processing system, the sensor data to determine whether the component used in the well operation is experiencing an error condition;
   alerting, by the processing system, a user of the error condition when it is determined that the component used in the well operation is experiencing an error condition; and
   performing an automated shutdown of the well operation when it is determined that the component used in the well operation is experiencing the error condition.

2. The method of claim 1, further comprising:
   displaying, by the processing system, a status of the component used in the well operation, wherein the status is determined based on the sensor data.

3. The method of claim 2, wherein the status of the component used in the well operation indicates a warning level of one of nominal, warning, or critical.

4. The method of claim 3, further comprising:
   removing the component from the well operation when the status indicates a warning level of warning.

5. The method of claim 3, further comprising:
   halting the well operation when the status indicates a warning level of critical.

6. A method for monitoring a component used in a well operation, the method comprising:
   receiving, by a processing system, noise data from a sensor, wherein the sensor collects noise data relating to a component used in the well operation;
   analyzing, by the processing system, the sensor data to determine a noise property of the component used in the well operation;
   determining, by the processing system, whether the noise property exceeds a threshold; and
   alerting, by the processing system, a user of an error condition when it is determined that the noise property exceeds the threshold.

7. The method of claim 6, wherein the noise property is one of engine revolutions per minute, percent load, pump pressure, super charge pressure, and vibration.

8. The method of claim 6, further comprising:
   displaying, by the processing system, a status of the component used in the well operation, wherein the status is determined based on the noise data.

9. The method of claim 6, wherein the threshold is a first threshold, the method further comprising:
   removing the component from the well operation when the noise property exceeds a second threshold, wherein the second threshold is greater than the first threshold.

10. The method of claim 9, further comprising:
    halting the well operation when the noise property exceeds a third threshold, wherein the third threshold is greater than the second threshold.

11. The method of claim 6, wherein the alerting further comprises alerting the user to change a specific part of the component used in the well operation based the noise property.

12. A system for monitoring a well operation, the system comprising:
    a plurality of components used in the well operation, wherein each of the plurality of components comprises at least one sensor to collect data relating to the component;
    a memory having computer readable instructions; and
    a processing device for executing the computer readable instructions, the computer readable instructions comprising:
       receiving sensor data from the at least one sensor for each of the plurality of components used in the well operation;
       displaying a status of each of the plurality of components used in the well operation, wherein the status is determined based on the sensor data;
       analyzing the sensor data to determine whether one or more of the plurality of components used in the well operation is experiencing an error condition;
       alerting, by the processing system, a user of the error condition and the associated component when it is determined that the one or more of the plurality of components used in the well operation is experiencing an error condition; and
       performing an automated shutdown of the well operation when it is determined that the component used in the well operation is experiencing the error condition.

13. The system of claim 12, wherein the error condition is excessive vibration or noise.

14. The system of claim 12, wherein the instructions further comprise:
    halting the well operation when one or more of the plurality of components used in the well operation is experiencing an error condition.

15. The system of claim 12, wherein the instructions further comprise:
removing the component from the well operation when one or more of the plurality of components used in the well operation is experiencing an error condition.

* * * * *